Aug. 10, 1965  R. F. REIFERS  3,199,758
MOLDED PULP EGG CARTON
Filed July 16, 1959  3 Sheets-Sheet 1
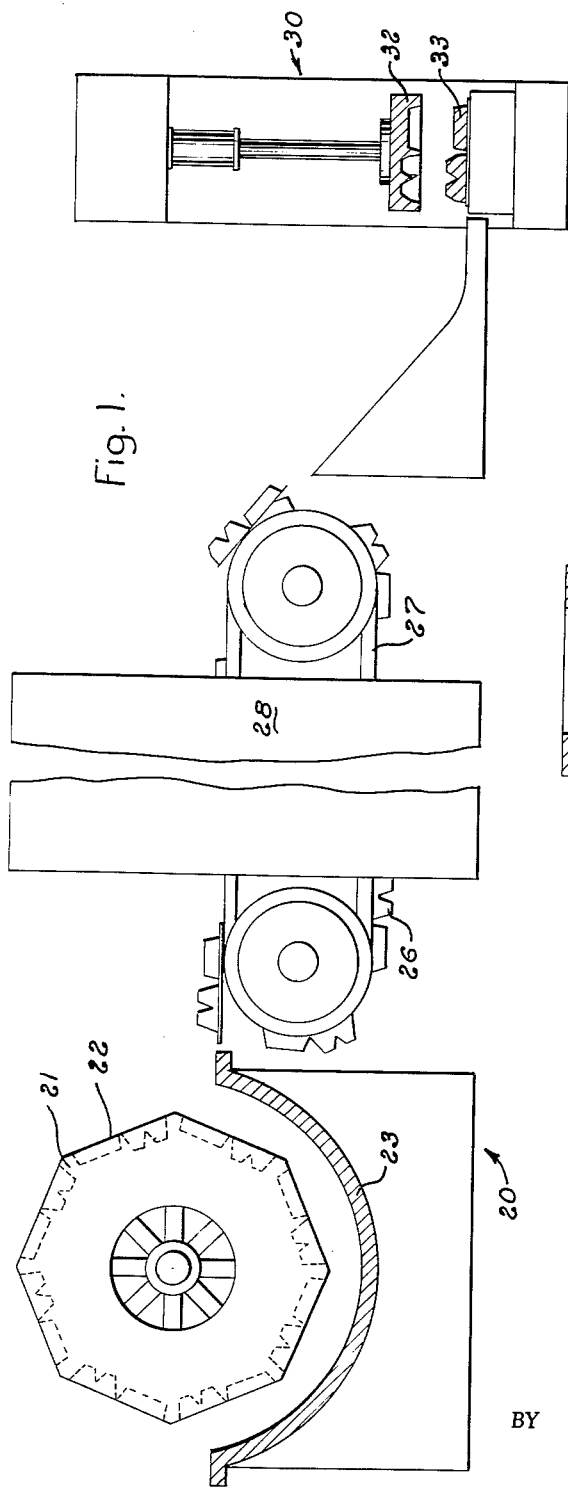
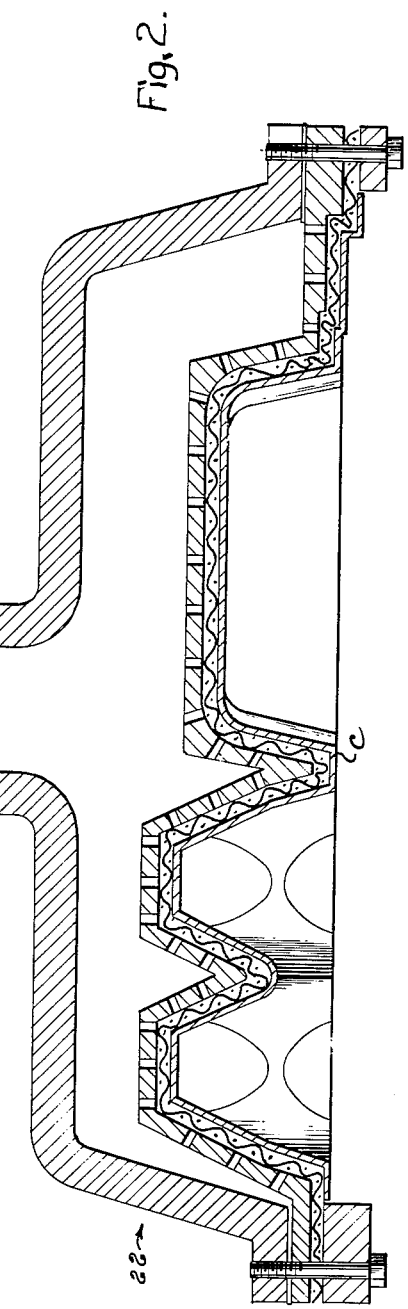
INVENTOR
Richard F. Reifers
BY Karl W. Flocks
ATTORNEY Aug. 10, 1965  R. F. REIFERS  3,199,758
MOLDED PULP EGG CARTON
Filed July 16, 1959  3 Sheets-Sheet 2
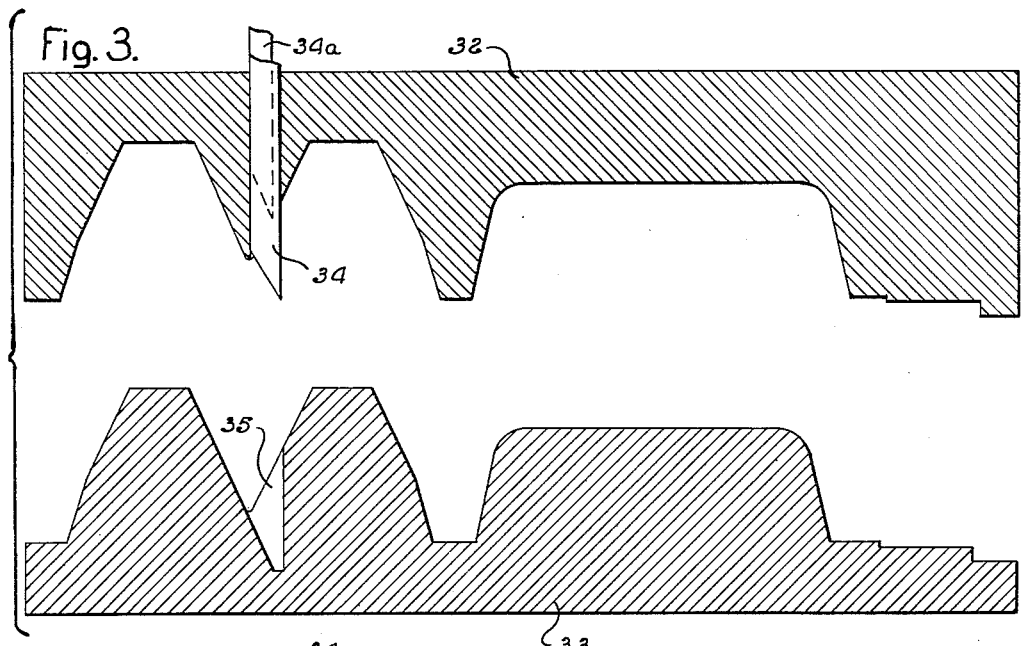
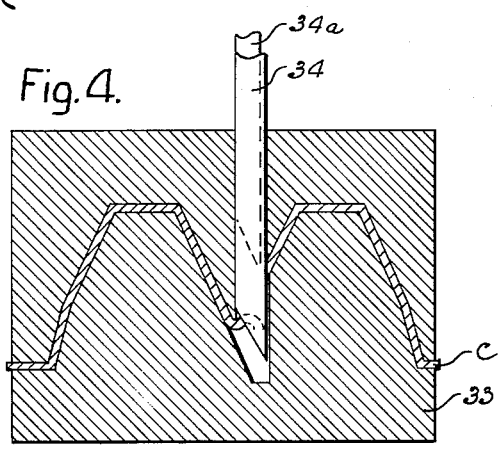
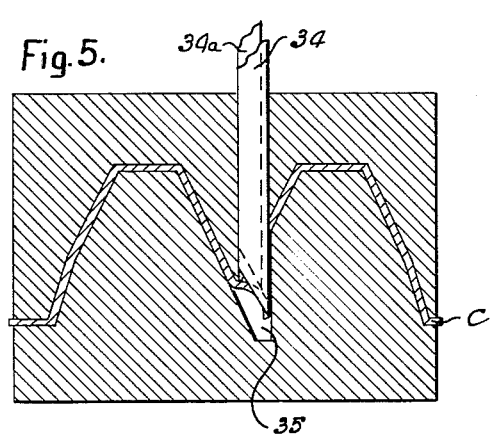
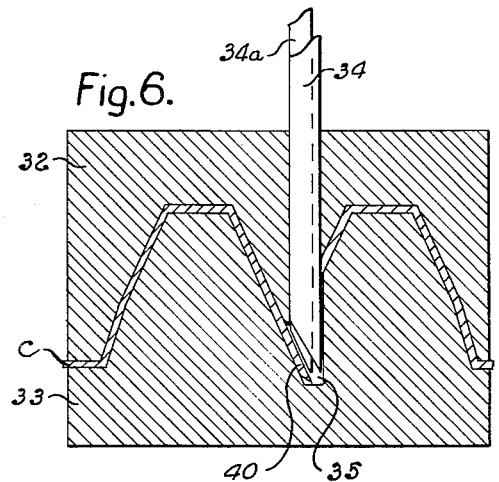
INVENTOR
Richard F. Reifers
BY Karl W. Flocks
ATTORNEY Aug. 10, 1965  R. F. REIFERS  3,199,758
MOLDED PULP EGG CARTON
Filed July 16, 1959  3 Sheets-Sheet 3
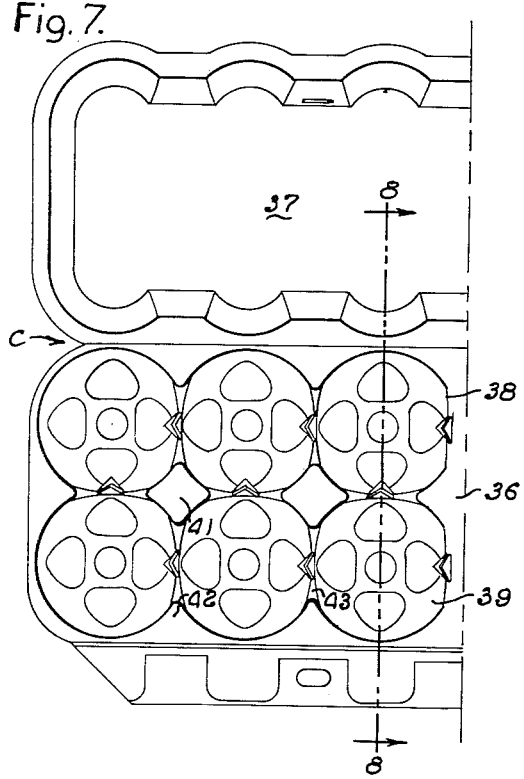
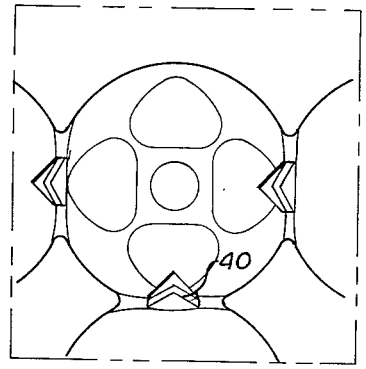
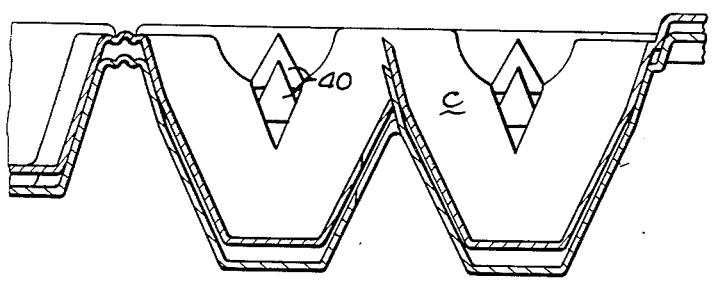
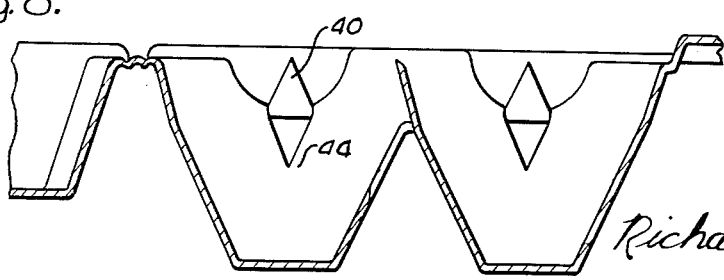
INVENTOR
Richard F. Reifers
BY Karl W. Flocks
ATTORNEY

United States Patent Office 3,199,758
Patented Aug. 10, 1965

3,199,758
MOLDED PULP EGG CARTON
Richard F. Reifers, New Canaan, Conn., assignor to
  Diamond International Corporation, a corporation
  of Delaware
Filed July 16, 1959, Ser. No. 827,512
6 Claims. (Cl. 229—2.5)

The present invention relates to a molded pulp egg carton and a method of making a molded pulp egg carton, and more particularly to a molded pulp egg carton having an egg-separating projection or flap cut from the wall of the egg cell and extending upwardly from a saddle formed at the merger of adjacent cell walls.

As was pointed out in my copending application Serial No. 717,664, filed Feb. 26, 1958, now abandoned, for Molded Pulp Egg Carton, the demand for better packaging of eggs so as to diminish egg breakage has resulted in the widespread use of cartons for eggs that afford more protection to the eggs. Thus, great strides have been made in this field, with the result that egg breakage during the handling and marketing operations has been greatly reduced.

Notwithstanding the improvements that have been made and the great protection afforded to eggs by certain types of molded pulp egg cartons, there still occurs, nevertheless, a certain amount of egg breakage and even this amount, small through it may be, is undesirable and should be avoided. It has been discovered that one cause of the breakage that still exists is the striking together of two adjacent eggs during the handling or shipping of the egg cartons.

In my copending application, above noted, I disclosed that a small projection could be provided at a saddle that is formed at the merger of adjacent cell walls, and that this projection extending upwardly from the saddle, would prevent the striking together of eggs in adjacent cells. It was also disclosed in said application that the projection is preferably formed on the carton during the forming operation, i.e., during the forming of the carton onto a forming die that is immersed in a pulp slurry. While the egg-separating projection thus formed is a markedly improved egg carton, the forming of the projection concurrently with the forming of the egg carton necessitates the change in the forming dies, and this change, while of minor nature, is nevertheless a matter of not insignificant cost.

An object of the present invention is to provide a process for making a molded pulp egg carton having an egg separating projection, which process is relatively inexpensive.

Another object of the present invention is the provision of a process for making a molded pulp egg carton having an egg-separating projection between egg cells, which process does not require any change to the molding dies.

It is another object of the present invention to provide a process for making a molded pulp egg carton having an egg-separating projection between the cells thereof, the projection being formed during a step in the known process.

Yet another object of the present invention is to provide an egg carton having an egg-separating flat severed therefrom.

Other objects and the nature and advantages of the instant invention will be apparent from the following description taken in conjunction with the accompanying drawings, wherein:

FIG. 1 shows schematically an apparatus for performing the process of the invention.

FIG. 2 is an enlarged view of a forming die shown in FIG. 1.

FIG. 3 is an enlarged view of the pressing dies shown in FIG. 1.

FIGS. 4, 5 and 6 are enlarged partial views showing successive steps during the process.

FIG. 7 is a plan view of an egg carton made in accordance with the process of the present invention.

FIG. 8 is an enlarged fragmentary cross-sectional view taken on the line 8—8 of FIG. 7.

FIG. 9 is an enlarged fragmentary plan view illustrating, on a larger scale, a single egg cell and fragments of adjoining egg cells in accordance with the invention herein set forth.

FIG. 10 is a view illustrating the stacking of a plurality of cartons in nested relationship.

Referring now to the drawings wherein like reference characters are used to designate like or corresponding parts throughout the several views, there is shown in FIG. 1 an apparatus for carrying out the process of the invention, and there may be seen therein the molding apparatus generally designated 20, this molding apparatus comprising in known manner a molding wheel 21 having on the periphery thereof a plurality of forming dies 22. A tank 23 containing a plup slurry is positioned beneath the wheel 21 so that the dies 22 will be immersed in the slurry as the wheel 21 revolves. In known fashion, when the die 22 is immersed in the slurry, suction will be applied to the inner sides thereof to suck the slurry through the die 22 so that the pulp fibers lodge on the outer surface of the mold, which is usually a fine mesh screen.

Referring to FIG. 2, there is shown therein a die 22 that has the molded pulp egg carton C thereon.

When the carton has been formed on the forming die 22, it leaves the slurry and at this stage contains a greater amount of water. The carton is then removed from the die 22 and transferred to a drying form 26 that is carried by a conveyor 27. Conveyor 27 extends through a drying apparatus, preferably a drying oven 28. After traversing the oven 28, the article is placed between pressing dies and is there pressed.

The pressing dies may be mounted as shown in FIG. 1 in a press 30 which carries the mutually reciprocable mating dies 32 and 33. The carton is removed from the drying form 26, and at this stage, of course, it will be understood that the carton is formed and dried and that it usually has at this stage of its manufacture a small amount of warpage. It is transferred by known means to the press 30, and there is then effected a reciprocable movement of one or both of the pressing dies 32 and 33 to cause them to come together and press the carton between them.

As is shown in FIG. 3, the pressing dies 32 and 33 are of mating configuration, generally speaking, the pressing die 32 having a sharpened, hollow steel pin 34 extending therefrom, with a punch 34a therein, and the die 33 having a corresponding hole or cavity 35 therein.

In FIGS. 4, 5 and 6, there may be seen the steps by which the projection or flap is cut from the side wall of the carton C and is moved to the upstanding position above mentioned. In FIG. 4, the pin 34 may be seen extending from the die 32 and cutting a flap from the carton C positioned on the die 33. In FIG. 5 the punch 34a is descending to engage with and is about to push it into the space provided by the cavity 35, and in FIG. 6 the punch 34a has pushed the projection or flap 40 into its final position; as will be seen, the pin 34, the punch 34a and the flap 40 are received in the cavity 35 of the die 33.

Referring now to FIG. 7, the carton C may be seen to comprise a cellular, pronouncedly compartmented bottom section 36, to which a non-cellular or open-faced, tray-like cover section 37 is integrally hinged. The interior of bottom section 36 is partially subdivided into two rows of six egg-receiving cells 38. The cells 38 are formed by, and comprise, upwardly and outwardly inclined walls 39, these walls extending upwardly to form posts 41 along the longitudinal center line of the carton and half-posts 42 along the edges of the carton bottom section 36. In addition, the adjacent walls 39 of adjacent cells 38 converge into a saddle-like juncture 43, these junctures 43 extending between the posts 41 and half-posts 42. As is best seen in FIG. 8, the flaps or projections 40 extend upwardly. The base of the flap 40, that is the region 44 that was not cut by the pin 34 lies adjacent the juncture 43. FIG. 9 shows to an enlarged scale the configuration of the parts and the position of the flap or projection 40.

In FIG. 10 it may readily be seen that the provision of the projection or flap 40 in no way interferes with the nesting of the cartons C for shipment, for as may be seen therefrom the flap 40 of the lower carton extends through the hole or opening in the side wall of the carton thereabove that was made to form the flap 40 of the upper carton.

It will be readily understood by those skilled in the art that the process may be carried out by apparatus other than that disclosed and shown; as an example, the cutting out or punching out of the flaps 40 could be accomplished on appropriate punch-presses that do not press the cartons, and that the punching out operation could take place either before or after the pressing of the carton in the press 30. In addition, it will be understood that the flaps 40 could be cut out by hand and pushed into the desired position by the fingers or a simple hand implement.

Further, it will be understood that the flap has been shown as generally triangular but that if desired other configurations may be used.

It will be obvious to those skilled in the art that various changes may be made without departing from the spirit of the invention and therefore the invention is not limited to what is shown in the drawings and described in the specification but only as indicated in the appended claim.

I claim:

1. A molded pulp container comprising a bottom section having a plurality of article receiving cells therein comprising a longitudinally extending partition and a plurality of transverse partitions, adjacent walls of adjacent cells being upwardly and outwardly inclined and converging in a saddle-like juncture below the upper margin of said cells, a flap integral with and substantially the same thickness as one side wall of a pair of the adjacent cells, said flap extending upwardly from a region adjacent said saddle-like juncture and terminating at its upper end adjacent the upper margin of said cells, whereby to prevent lateral shifting of said articles in said pair of adjacent cells and engagement therebetween, the portion of the adjacent walls of said pair of adjacent cells which underlies said flap being of reduced height to define an opening permitting flap entry of another like container placed below in stacked relation.

2. An integrally molded pulp egg container comprising a bottom section having side walls and end walls connected to each other and to a bottom wall, a plurality of substantially longitudinally and transversely positioned upwardly extending and convergingly sloping pairs of spaced adjacent wall members, said pairs of adjacent wall members forming a longitudinally extending partition and a plurality of transverse portions joined to said bottom wall and comprising means together with said bottom wall dividing said container into a plurality of egg receiving cells, the height of said partitions being in part substantially below the upper margin of said cells, a flap integral with and extending from one wall of each of said adjacent pairs of wall members, said flaps having substantially the same thickness as a wall member and extending upwardly from the top of said partition portion which is below the upper margin of said cells a substantial distance and to at least the point of maximum diameters of eggs positioned in adjacent cells to thereby provide cushioning means preventing contact between said eggs, the portion of the other wall adjacent the said one wall with the flap extending thereabove being of reduced height to define an opening permitting flap entry of another like container placed below in stacked relation.

3. A molded pulp container comprising a bottom section having a plurality of article receiving cells therein comprising a longitudinally extending partition and a plurality of transverse partitions, adjacent walls of adjacent cells being upwardly and outwardly inclined and converging in a saddle-like juncture below the upper margin of said cells, a flap integral with and substantially the same thickness as one side wall of a pair of the adjacent cells, said flap extending upwardly from a region adjacent said saddle-like juncture and terminating at its upper end adjacent the upper margin of said cells, whereby to prevent lateral shifting of said articles in said pair of adjacent cells and engagement therebetween, said flap being tapered in width from its widest point at the bottom adjacent said saddle-like juncture to a narrower width at the top thereof, the portion of the adjacent walls of said pair of adjacent cells which underlies said flap being of reduced height to define an opening permitting flap entry of another like container placed below in stacked relation.

4. A molded pulp container comprising a bottom section having a plurality of article receiving cells therein comprising a longitudinally extending partition and a plurality of transverse partitions, adjacent walls of adjacent cells being upwardly and outwardly inclined and converging in a saddle-like juncture below the upper margin of said cells, a flap integral with and substantially the same thickness as one side wall of a pair of the adjacent cells, said flap extending upwardly from a region adjacent said saddle-like juncture and terminating at its upper end adjacent the upper margin of said cells, whereby to prevent lateral shifting of said articles in said pair of adjacent cells and engagement therebetween, the pulp material forming said flap and adjacent side walls being equal to the amount of pulp material providing said adjacent walls without said flap formed on said one side wall.

5. A molded pulp container comprising a bottom section having a plurality of article receiving cells therein comprising a longitudinally extending partition and a plurality of transverse partitions, adjacent walls of adjacent cells being upwardly and outwardly inclined and converging in a saddle-like juncture below the upper margin of said cells, a flap integral with and substantially the same thickness as one side wall of a pair of the adjacent cells, said flap extending upwardly from a region adjacent said saddle-like juncture and terminating at its upper end adjacent the upper margin of said cells, whereby to prevent lateral shifting of said articles in said pair of adjacent cells and engagement therebetween, the pulp material forming said flap and adjacent side walls being equal to the amount of pulp material providing said adjacent walls without said flap formed on said one side walls, said other side wall including an opening therethrough substantially conforming to the configuration of said flap.

6. A molded pulp container comprising a bottom section having a plurality of article receiving cells therein comprising a longitudinally extending partition and a plurality of transverse partitions, adjacent walls of adjacent cells being upwardly and outwardly inclined and converging in a saddle-like juncture below the upper margin of said cells, a flap integral with and substantially the same thickness as one side wall of a pair of the adjacent cells, said flap extending upwardly from a region adjacent said saddle-like juncture and terminating at its upper end adjacent the upper margin of said cells, whereby to prevent lateral shifting of said articles in said pair of adjacent cells and engagement therebetween, the pulp material forming said flap and adjacent side walls being equal to the amount of pulp material providing said adjacent walls without said flap formed on said one side wall, said adjacent walls including lower angular portions merging into an inverted frusto-conical portion, the frusto-conical portions of said adjacent cells forming said saddle-like juncture therebetween.

References Cited by the Examiner

UNITED STATES PATENTS

| | | | |
|---|---|---|---|
| 1,919,028 | 7/33 | Koppelman | 217—26.5 X |
| 1,922,145 | 8/33 | Troyk | 229—29 |
| 1,963,134 | 6/34 | Keiding | 162—223 |
| 2,197,510 | 4/40 | Ringler | 229—28 |
| 2,515,113 | 7/50 | Chaplin | 162—223 |
| 2,517,465 | 8/50 | Cox. | |
| 2,738,914 | 3/56 | Hatch | 229—2.5 |
| 2,808,976 | 10/57 | Chaplin | 229—2.5 |

GEORGE O. RALSTON, *Primary Examiner.*

FRANKLIN T. GARRETT, EARLE J. DRUMMOND, *Examiners.*